(12) United States Patent
Muller et al.

(10) Patent No.: US 12,165,028 B2
(45) Date of Patent: Dec. 10, 2024

(54) EXTRACTING SEQUENCES FROM d-DIMENSIONAL INPUT DATA FOR SEQUENTIAL PROCESSING WITH NEURAL NETWORKS

(71) Applicant: International Business Machines Corporation, Armonk, NY (US)

(72) Inventors: Lorenz K. Muller, Dubendorf (CH); Pascal Stark, Thalwil (CH); Stefan Abel, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 1170 days.

(21) Appl. No.: 16/940,925

(22) Filed: Jul. 28, 2020

(65) Prior Publication Data

US 2022/0036245 A1 Feb. 3, 2022

(51) Int. Cl.
*G06N 20/20* (2019.01)
*G06F 17/18* (2006.01)
(Continued)

(52) U.S. Cl.
CPC ............. *G06N 20/20* (2019.01); *G06F 17/18* (2013.01); *G06F 18/24* (2023.01); *G06N 3/04* (2013.01);
(Continued)

(58) Field of Classification Search
CPC ........ G06N 20/00; G06N 20/10; G06N 20/20; G06N 3/02; G06N 3/04; G06N 3/044;
(Continued)

(56) References Cited

U.S. PATENT DOCUMENTS

2003/0194124 A1 10/2003 Suzuki et al.
2014/0365949 A1* 12/2014 Xia .................. G06F 40/166
715/780
(Continued)

FOREIGN PATENT DOCUMENTS

KR 20180093970 A 8/2018

OTHER PUBLICATIONS

Sueiras et al., "Offline continuous handwriting recognition using sequence to sequence neural networks", Feb. 7, 2018, Neurocomputing, 289, pp. 119-128. (Year: 2018).*
(Continued)

*Primary Examiner* — Shane D Woolwine
(74) *Attorney, Agent, or Firm* — Yee & Associates, P.C.

(57) ABSTRACT

A method and computer program product for obtaining values are run using a neural network according to a machine learning algorithm. One embodiment may comprise accessing one or more datafiles of input data, where the input data is representable in a d-dimensional space, with $d > 1$. The method may explore N distinct paths of the input data in the d-dimensional space, where $N \geq 1$, and collects data along the N distinct paths explored to respectively form N sequences of M objects each, with $M \geq 2$. For one or more sequences of the N sequences formed, values obtained from the M objects of each sequence may be coupled into one or more input nodes of a neural network, which is then run according to the machine learning algorithm to obtain L output values from, $L \geq 1$.

20 Claims, 9 Drawing Sheets

(51) Int. Cl.

| | |
|---|---|
| *G06F 18/24* | (2023.01) |
| *G06N 3/04* | (2023.01) |
| *G06N 3/044* | (2023.01) |
| *G06N 3/045* | (2023.01) |
| *G06N 3/049* | (2023.01) |
| *G06N 3/065* | (2023.01) |
| *G06N 3/08* | (2023.01) |
| *G06N 5/04* | (2023.01) |
| *G06V 10/44* | (2022.01) |
| *G06V 10/82* | (2022.01) |
| *G06V 30/10* | (2022.01) |

(52) U.S. Cl.
CPC .............. *G06N 3/065* (2023.01); *G06N 3/08* (2013.01); *G06N 5/04* (2013.01); *G06V 10/44* (2022.01); *G06N 3/044* (2023.01); *G06N 3/045* (2023.01); *G06N 3/049* (2013.01); *G06V 10/82* (2022.01); *G06V 30/10* (2022.01)

(58) Field of Classification Search
CPC ...... G06N 3/045; G06N 3/0455; G06N 3/049; G06N 3/0495; G06N 3/065; G06N 3/08; G06N 5/04; G06F 17/18; G06F 18/24; G06V 10/44; G06V 10/82; G06V 30/10
See application file for complete search history.

(56) References Cited

U.S. PATENT DOCUMENTS

| | | | | |
|---|---|---|---|---|
| 2016/0140956 | A1 | 5/2016 | Yu et al. | |
| 2018/0196892 | A1* | 7/2018 | Viana | G06N 7/01 |
| 2018/0329897 | A1* | 11/2018 | Kalchbrenner | G06N 3/047 |
| 2019/0057308 | A1 | 2/2019 | Cho et al. | |
| 2019/0384898 | A1* | 12/2019 | Chen | G06F 21/36 |
| 2021/0216760 | A1* | 7/2021 | Howell | G06V 30/36 |
| 2022/0036198 | A1 | 2/2022 | Muller et al. | |
| 2022/0406473 | A1* | 12/2022 | Arbel | G06F 3/1454 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

Ciortan, "Gentle Introduction to Echo State Networks," Towards Data Science, Mar. 27, 2019, 4 pages https://towardsdatascience.com/gentle-introduction-to-echo-state-networks-af99e5373c68.

Mostafa et al., "Parameter Efficient Training of Deep Convolutional Neural Networks by Dynamic Sparse Reparameterization," Proceedings of the 36th International Conference on Machine Learning, California, 2019, 10 pages, http://proceedings.mlr.press/v97/mostafa19a/mostafa19a.pdf.

Srinivas et al., "Training Sparse Neural Networks," 2017 IEEE Conference on Computer Vision and Pattern Recognition Workshops, Jul. 2017, 8 pages, https://ieeexplore.ieee.org/document/8014795.

List of IBM Patents or Patent Applications Treated as Related, Dated Jul. 24, 2020, 2 pages.

Crellin, "Modeling Image Sequences With Particular Application to FMRI Data," Dissertation to Stanford University, Dec. 1996, 161 pages, Copyright 1997 by Neil J. Crellin.

Presti et al., "Two-Dimensional Random Adaptive Sampling for Image Scanning," IEEE Transactions on Geoscience and Remote Sensing, vol. 38, No. 6, Nov. 2000, 10 pages.

Jalalvand et al., "On the Application of Reservoir Computing Networks for Noisy Image Recognition," Elsevier, Nov. 29, 2017, 16 pages.

Mnih et al., "Recurrent Models of Visual Attention," Paper, Printed Jul. 23, 2020, 9 pages.

Jaeger, "Echo state network," Scholarpedia, 2007, 12 pages, doi:10.4249/scholarpedia.2330 http://www.scholarpedia.org/article/Echo_state_network.

Muller et al., "Kernelized Synaptic Weight Matrices," Proceedings of the 35th International Conference on Machine Learning, Sweden, 2018, 10 pages.

Jie Yu et al., "A Review of Network Compression based on Deep Network Pruning," Atlantis Press, Advances in Computer Science Research, 3rd International Conference on Mechatronics Engineering and Information Technology (ICMEIT 2019), 12 pages.

Hinton et al., "Distilling the Knowledge in a Neural Network," arXiv:1503.02531v1, Mar. 9, 2015, 9 pages.

Breiman, Leo, "Bagging Predictors", Machine Learning vol. 24, pp. 123-140 (1996).

Muller et al., "Neuromorphic Systems Design by Matching Inductive Biases to Hardware Constraints," Frontiers in Neuroscience, Original Research, Published May 28, 2020, 11 pages, doi: 10.3389/fnins.2020.00437.

Rucci et al., "The Unsteady Eye: an Information Processing Stage, not a Bug," Elsevier Ltd., HHS Public Access, Published as Trends Neurosci. Apr. 2015, 28(4): 195-206, doi: 10.1016/j.tins.2015.01.005.

H. Jaeger, "The "echo state" approach to analysing and training recurrent neural networks—with an erratum note," Bonn, Germany: German National Research Center for Information Technology GMD Technical Report, vol. 148, p. 34, 2001. (Year: 2001), as cited in the Non-Final Office Action for U.S. Appl. No. 16/940,857 dated Feb. 28, 2023.

Jochen J. Steil (2007). Online reservoir adaptation by intrinsic plasticity for backpropagation—decorrelation and echo state learning. Neural Networks, 20(3), 353-364. (Year: 2007), as cited in the Non-Final Office Action for U.S. Appl. No. 16/940,857 dated Feb. 28, 2023.

G. Zhang, C. Zhang, Z. Li and W. Zhang, "A New PSOGSA Inspired Convolutional Echo State Network for Long-term Health Status Prediction," 2018 IEEE International Conference on Robotics and Biomimetics (ROBIO), Kuala Lumpur, Malaysia, 2018, pp. 1298-1303, doi: 10.1109/ROBIO.2018.8665099. (Year: 2018), as cited in the Non-Final Office Action for U.S. Appl. No. 16/940,857 dated Feb. 28, 2023.

Lapedes, A., & Farber, R. (1987). How Neural Nets Work. In Neural Information Processing Systems. American Institute of Physics (Year: 1987), as cited in the Non-Final Office Action for U.S. Appl. No. 16/940,857 dated Feb. 28, 2023.

N. Schaetti, M. Salomon and R. Couturier, "Echo State Networks-Based Reservoir Computing for MNIST Handwritten Digits Recognition," 2016 IEEE Intl Conference on Computational Science and Engineering (CSE) and IEEE Intl Conference on Embedded and Ubiquitous Computing (EUC) and (DCABES) 2016 pp. 481-491 (Year: 2016), as cited in the Non-Final Office Action for U.S. Appl. No. 16/940,857 dated Feb. 28, 2023.

Naima Chouikhi, Boudour Ammar, Amir Hussain, & Adel M. Alimi (2019). Bi-level multi-objective evolution of a Multi-Layered Echo-State Network Autoencoder for data representations. Neurocomputing, 341, 195-211. (Year: 2019), as cited in the Non-Final Office Action for U.S. Appl. No. 16/940,857 dated Feb. 28, 2023.

Kyle Helfrich, & Qiang Ye. (2019). Eigenvalue Normalized Recurrent Neural Networks for Short Term Memory. (Year: 2019), as cited in the Non-Final Office Action for U.S. Appl. No. 16/940,857, dated Dec. 19, 2023.

Lym, S., Choukse, E., Zangeneh, S., Wen, W., Sanghavi, S., & Erez, M. (2019). PruneTrain: fast neural network training by dynamic sparse model reconfiguration. In Proceedings of the International Conference for High Performance Computing, Networking, Storage and Analysis. ACM. (Year: 2019), as cited in the Non-Final Office Action for U.S. Appl. No. 16/940,857, dated Dec. 19, 2023.

Sachin S. Talathi, & Aniket Vartak. (2016). Improving performance of recurrent neural network with relu nonlinearity. (Year: 2016), as cited in the Non-Final Office Action for U.S. Appl. No. 16/940,857, dated Dec. 19, 2023.

(56) References Cited

OTHER PUBLICATIONS

Sharat C. Prasad, & Piyush Prasad. (2014). Deep Recurrent Neural Networks for Time Series Prediction. (Year: 2014), as cited in the Non-Final Office Action for U.S. Appl. No. 16/940,857, dated Dec. 19, 2023.
Ugurlu, U.; Oksuz, I.; Tas, 0. Electricity Price Forecasting Using Recurrent Neural Networks. Energies 2018, 11, 1255. https://doi.org/10.3390/en11051255 (Year: 2018), as cited in the Non-Final Office Action for U.S. Appl. No. 16/940,857, dated Dec. 19, 2023.
M. Cernansky and M. Makula, "Feed-forward echo state networks," Proceedings. 2005 IEEE International Joint Conference on Neural Networks, 2005., Montreal, QC, Canada, 2005, pp. 1479-1482 vol. 3, doi: 10.1109/IJCNN.2005.1556094. (Year: 2005), as cited in the Final Office Action for U.S. Appl. No. 16/940,857, dated Jul. 13, 2023.
Final Office Action dated Apr. 8, 2024, regarding U.S. Appl. No. 16/940,857, 23 pages.
Final Office Action dated Jul. 13, 2023, regarding U.S. Appl. No. 16/940,857, 44 pages.
Office Action dated Dec. 19, 2023, regarding U.S. Appl. No. 16/940,857, 41 pages.
Office Action dated Feb. 28, 2023, regarding U.S. Appl. No. 16/940,857, 48 pages.
Zhong, et al., "Recurrent Attention Unit," Oct. 30, 2018, 8 pages, Cornell University, arXiv, https://arxiv.org/abs/1810.12754.
Office Action dated Aug. 26, 2024, regarding U.S. Appl. No. 16/940,857, 20 pages.

\* cited by examiner

EXTRACTING SEQUENCES FROM d-DIMENSIONAL INPUT DATA FOR SEQUENTIAL PROCESSING WITH NEURAL NETWORKS

This application is a result of a project funded by the Swiss National Science Foundation.

BACKGROUND

The present disclosure relates in general to machine learning and sequential processing algorithms. In particular, it is directed to a method exploring paths in d-dimensional input data to extract sequences of data and process such sequences through machine learning algorithms.

Machine learning often relies on artificial neural networks (ANNs), which are computational models inspired by biological neural networks in human or animal brains. Such systems progressively and autonomously learn tasks by means of examples; they have successfully been applied to, e.g., speech recognition, text processing, and computer vision. An ANN typically comprises a set of connected units or nodes, which compare to biological neurons in animal brains and are therefore called artificial neurons. Signals are transmitted along connections (also called edges) between artificial neurons, similarly to synapses. That is, an artificial neuron that receives a signal will typically processes it and then signal one or more connected neurons if threshold conditions are met. Many types of neural networks are known, starting with feed-forward neural networks (such as multilayer perceptrons), deep neural networks, and convolutional neural networks.

Neural networks are typically implemented in software. However, a neural network may also be implemented in hardware, e.g., as a resistive processing unit or an optical neuromorphic system.

Various machine learning algorithms are known, including sequential processing algorithms. Sequential processing algorithms can be implemented very efficiently in hardware. However, such algorithms are typically designed to process "static" input data, such as 2D images or 3D images.

SUMMARY

According to embodiments of the present disclosure, a computer-implemented method that obtains values by running a neural network according to a machine learning algorithm, where the latter is designed to operate on sequences of data. The method first comprises accessing one or more datafiles of input data, where the input data is representable in a d-dimensional space, with d>1. Next, the method explores N distinct paths of said input data in the d-dimensional space, where N≥1, and collects data along the N distinct paths explored to respectively form N sequences of M objects each, with M≥2. Finally, for each sequence of the N sequences formed, values obtained from the M objects of each of these sequences are coupled into one or more input nodes of a neural network, which is then run according to the machine learning algorithm to obtain L output values, where L≥1. The above operations can be performed for inference purposes or form part of a training flow.

According to embodiments of the present disclosure, a computer program product comprises a computer readable storage medium having program instructions embodied therewith. The program instructions are executable by a processor to cause the processor to perform all the operations of the above method.

The above summary is not intended to describe each illustrated embodiment or every implementation of the present disclosure. Computerized methods and computer program products embodying the present disclosure will now be described, by way of non-limiting examples, and in reference to the accompanying drawings.

BRIEF DESCRIPTION OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which:

FIGS. 5-7 are flowcharts illustrating high-level operations of methods according to embodiments. In detail, FIG. 5 illustrate general operations of the present methods, while FIGS. 6 and 7 show typical operations as performed for inference and training purposes, respectively.

The accompanying drawings show simplified representations of devices or parts thereof, as involved in embodiments. Similar or functionally similar elements in the figures have been allocated the same numeral references, unless otherwise indicated.

DETAILED DESCRIPTION

The following description is structured as follows. First, general embodiments and high-level variants are described, section 1. Section 2 addresses technical implementation details. Note, the present method and its variants are collectively referred to as the "present methods". All references S5$j$, S6$j$, and S7$j$ refer to operations in the flowchart of FIGS. 5, 6, and 7, respectively, while other references pertain to components of the unit of FIG. 8 or to objects involved in FIGS. 1-4.

1. General Embodiments and High-Level Variants 1.1. General Aspects of the Present Methods In reference to FIGS. 1-5, a first aspect of the disclosure is described, which concerns a computer-implemented method. Some embodiments of the method may aim at obtaining values by running a neural network according to a machine learning algorithm. The network and the machine learning algorithm may be jointly designed to operate on sequences of data. The network can be regarded as a computational structure (much like a graph), to which values can be associated, so as to give rise to a certain computational model. The machine learning algorithm may determine the mathematical operations needed to run the network. The machine learning algorithm may, for instance, be a sequential processing algorithm. More generally, however, the algorithm may be any algorithm, which together with the network configuration chosen, may allow sequences of data to be sequentially processed via the network.

Figure 1:
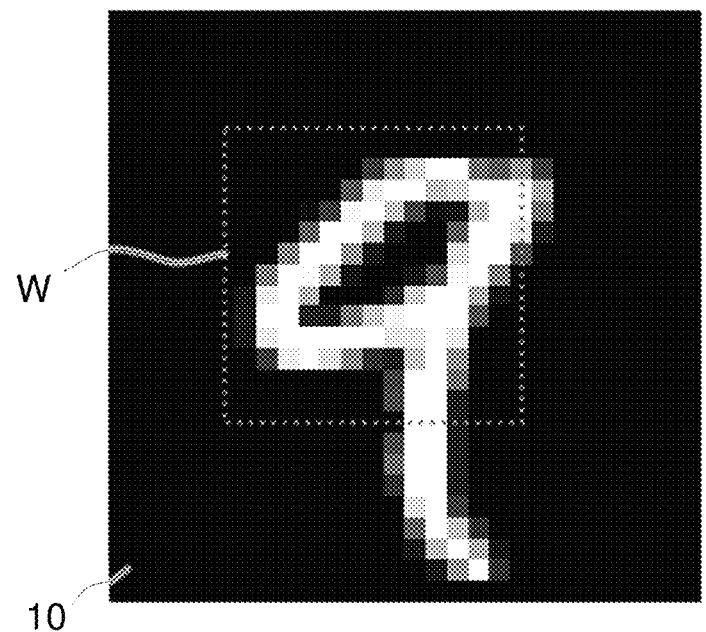
FIG. 1 is an example of a 2D image (a handwritten character), as used in input to a method according to embodiments. The image size is 28×28 pixels.
Figure 5:
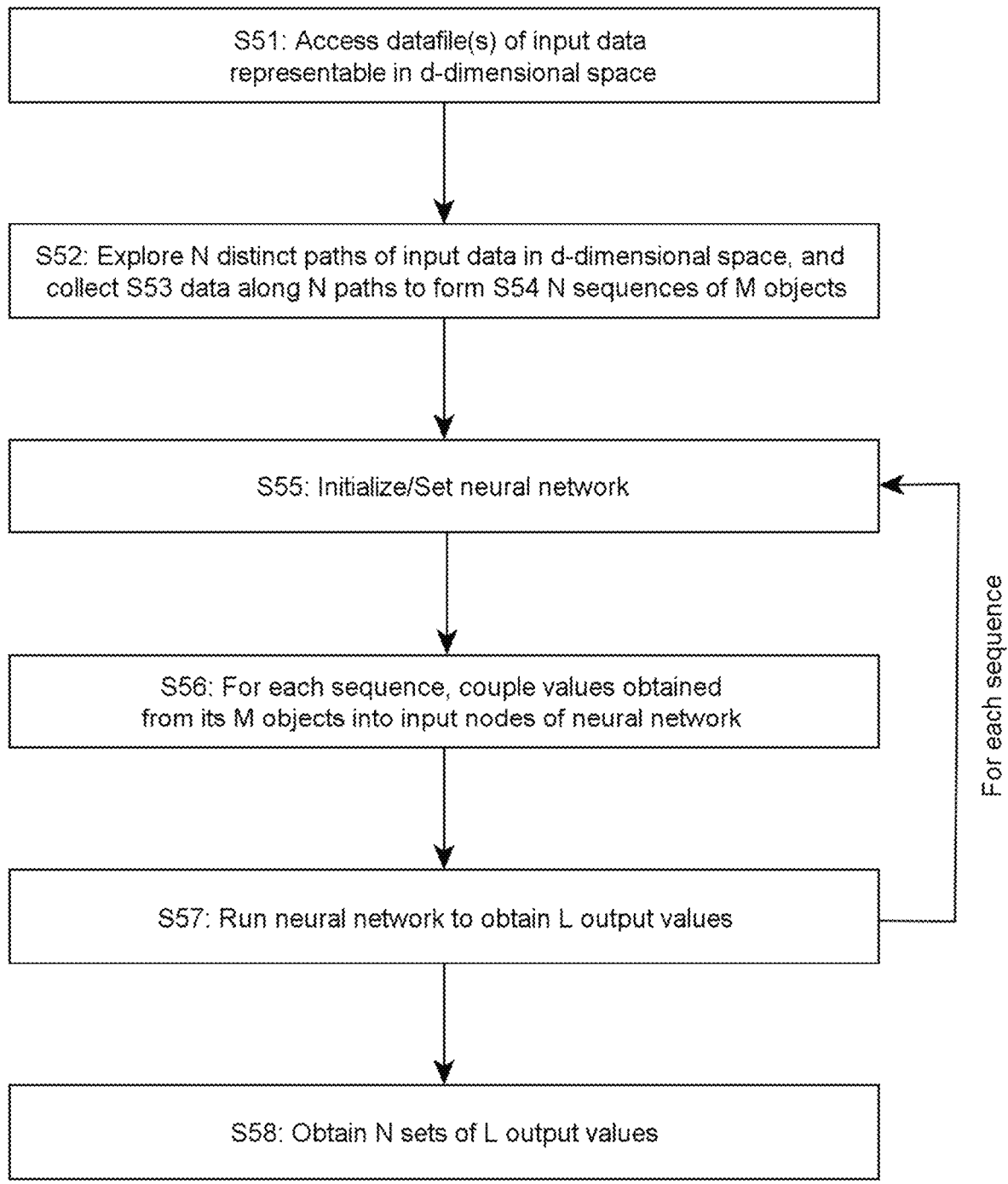

Initially referencing FIG. 5, first, the method may comprise accessing S51 one or more datafiles 10 of input data. The input data may be, as a whole, representable in a d-dimensional space, where d>1. The input data may possibly be entirely loaded in the main memory, the latter permitting, e.g., populating a corresponding data structure in the main memory. However, this is not a strict requirement. A simple example is considered, for illustration purposes, in which the data accessed are of a single 2D image, as shown in FIG. 1.

Figure 2A:
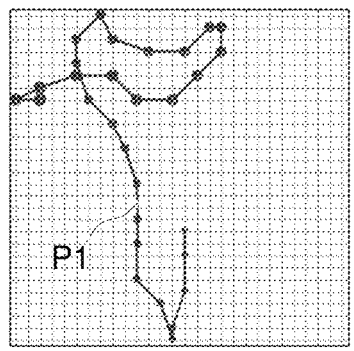
FIGS. 2A-2C illustrate three paths drawn at random in the input image of FIG. 1, as involved in embodiments.
Figure 2B:
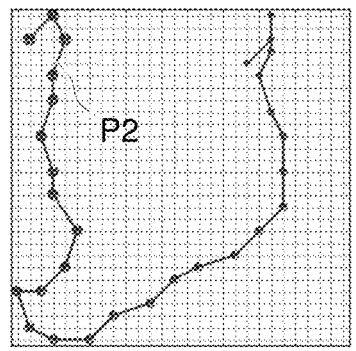
Figure 2C:
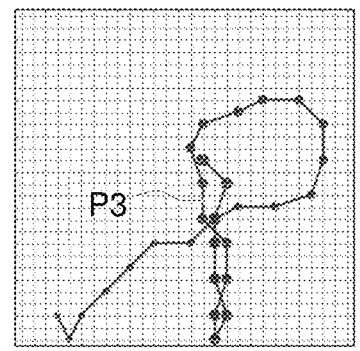
Figure 3A:
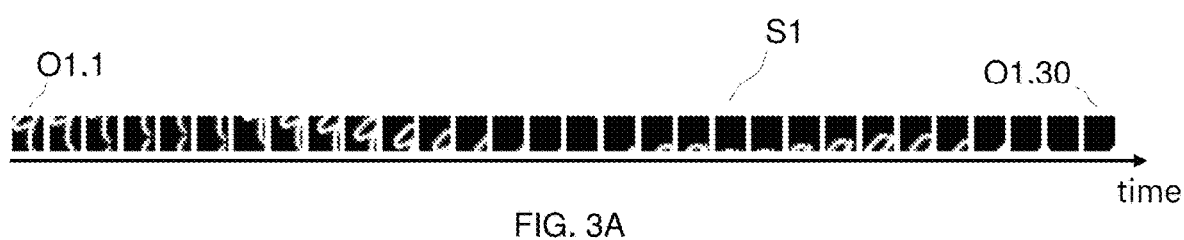
FIGS. 3A-3C show three sequences of objects obtained by collecting data along the three paths of FIGS. 2A-2C, where each object includes a n×n matrix of pixels (n=14), as collected about each point along the respective path, as involved in embodiments. The increasing point sizes reflect the order in which each path is scanned.
Figure 3B:
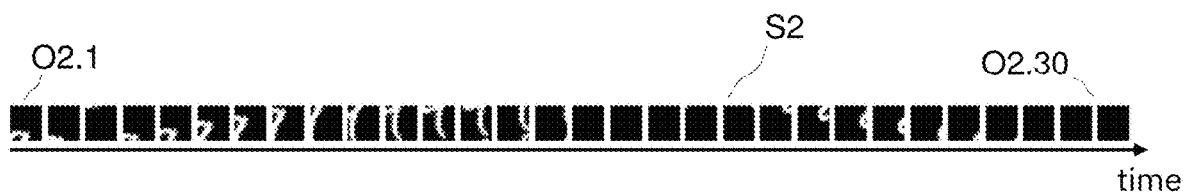
Figure 3C:
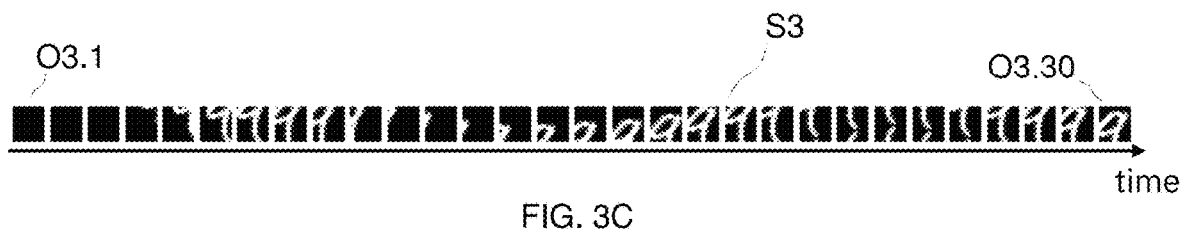

Second, at operation S52, the method may explore N distinct paths P1-P3 of the input data, N≥1, wherein such paths may be drawn in the d-dimensional space spanned by the input data. FIGS. 2A-2C depict three examples of such paths, as drawn in respective grids corresponding to pixel centers of the 2D image of FIG. 1. Data may be collected S53 along each of the N distinct paths explored, so as to respectively form N sequences of M objects each, M≥2, see operation S54 in FIG. 5. For example, such objects may be formed from small subsets (i.e., arrays) of values extracted from the initial image, where such values may be collected about each point of the explored paths, as assumed in FIGS. 3A-3C. The latter show three sequences S1-S3, each containing thirty objects, respectively denoted by references O1.1 . . . O1.30, O2.1 . . . O2.30, and O3.1 . . . O3.30. This way, a static object may be transformed into one or more sequences, which can then adequately be processed by a machine learning algorithm designed to operate on sequences of data.

That is, for each sequence of the N sequences S1-S3 formed at operation S54, values obtained from the M objects of said each sequence may be coupled S56 into one or more input nodes of a neural network, e.g., after having suitably set or initialized S55 the latter. The neural network may then be run S57 according to said machine learning algorithm, so as to obtain L output values, where L≥1.

The above recites high-level operations of the methods of some embodiments of the disclosure, in which operations may be performed for inference and/or training purposes, as discussed later in reference to FIGS. 6 and 7.

The input datafiles typically capture non-sequential input data. For example, the dimension d of the input datafile may be equal to 2 (e.g., as with 2D images), 3 (e.g., 3D images), or 4 (e.g., 3D images representing various states of an item, captured as separate 3D arrays or as a single 4D array), etc. More generally, the present methods may apply to any d-dimensional input file, where d>1. However, the input data may also reflect sequential data (e.g., a time-dependent 3D image). So, in general, input data may reflect sequential or non-sequential input data. In most cases, though, the present methods may result in creating new sequences from the input data.

The method may take a single data file as input or several data files. In many cases, however, the input file(s) capture(s) input data that, as a whole, span a d-dimensional space. For example, a set of 2D images may be initially accessed, which together form a 3D image. Now, the above method can be repeatedly applied for several sets of input data, where each set comprises one or more data files, each time in a same and consistent manner. In particular, the above method may be performed in parallel for multiple (sets of) input data files. In addition, the machine learning algorithm may be applied in parallel across different instances of a same cognitive model for the different scanning paths.

Each path is explored across the input data and, therefore, typically has a dimension that is strictly less than the dimension d of the space in which input data can be represented. The paths may be 1-dimensional objects, extending in the d-dimensional space spanned by the input data. In that case, a path may be regarded as a series of contiguous, discrete points in the d-dimensional space of the input data. However, a path may also be regarded as a 1D curve of such discrete points. Values may then be collected at each point (or about each point) to form a respective object, the dimension of which is normally less than or equal to d. The collected values may be processed, e.g., via an analytic function, prior to being stored in the corresponding object. The total number of values generated may exceed the total number of values comprised in the input data.

Notwithstanding the notation used herein, the number M of datapoints does not need be the same for all of the N data paths explored for a given set of input data. Because separate base learners (e.g., classifiers) may be trained, the number of datapoints may be varied from one sequence to the other. However, the number M of objects formed is typically assumed to be constant in the following, for simplicity. Similarly, the present methods may vary the scanning method used, yielding, e.g., paths with different step lengths between the path points. However, when several sets of input data files are loaded and repeatedly processed (in view of processing a single set of input data), then the same paths may be applied to each input data file (e.g., a 2D image).

At least one sequence is formed in some embodiments, i.e., N≥1. However, the number N of sequences formed will typically be larger than 1. For example, three paths are assumed in FIGS. 2A-2C, for the sake of illustration. Still, many more paths may be formed and explored in practice, although a typical range is 1≤N≤20. The optimal number of paths may depend on both the size of the input data files and the dimension thereof. The optimal number may also be application specific.

In general, the objects forming the sequences may be single datapoints (i.e., consisting, each, of a single value), or data structures, i.e., aggregating multiple values of data, as collected about each point of the paths explored. That is, an object can have a certain dimension k>1 and a certain size ($N_k$>1). For example, an object may consist of a small square (i.e., a matrix of pixel values, as assumed in FIGS. 3A-3B) or a small cube (e.g., a matrix of voxel values, as obtained when scanning a 3D image). Such values may typically be captured as arrays of numbers. For example, in the case of a 2D image, see FIG. 1, the exploration algorithm may slide a window W, e.g., a square window of n×n pixels along each path, as assumed in FIGS. 1-3. Relatively large windows are assumed for depiction purposes (n=14). Other basis shapes may be used for the window. For example, in the case of a 2D image, as in FIG. 1, one may slide a rectangular window of m×o pixels along each path. Note, the concept of a sliding window can be generalized to higher dimensions (e.g., a sliding cuboid/rectangular solid or hyper-cuboid/rectangular solid). The window is typically centered on each path point (as in FIGS. 2-3, although this is not strictly required (e.g., each path point may correspond to an edge or other point of the window).

In order to keep extracting consistent values when the sliding window reaches boundaries of the initial data, one may pad the data structure formed by the initial data. For example, an input image may be padded by half the window size+1 pixel along all axis by reflecting the image. In variants, one may simply add a "uniform border" to the input data structure, including extrapolated values.

Next, values obtained from each of the objects may be fed in the input layer of the neural network, for each of the sequences formed. In simpler variants, however, single values may be collected at each point along each path.

Various configurations (i.e., architectures) of neural networks can be considered. The network may, for example, include M input nodes (e.g., to process all single pixel values collected for each sequence). In some embodiments, however, the network includes $N_k$ input nodes, where $N_k$ correspond to the number of values obtained from each object. In that case, $N_k$ values as collected about each point along each path are sequentially fed into the $N_k$ input nodes of the network and a sequential processing algorithm is used to process such values. In that respect, the present methods are preferably implemented using dedicated hardware, designed for processing sequential data.

The network comprises L output nodes, wherein L≥1. Any suitable architecture of hidden layers and nodes can be considered. Some embodiments rely on a reservoir computing network and, in particular, on echo state networks. Enforcing the echo state property allows an easier training, as it may prevent fast exponential growth of activations (forward) and error terms (backward). To that aim, one may impose the fixed weight matrix to have a spectral radius that is strictly less than one, even though this is not strictly required to achieve the echo state property. Besides, the present methods may use feed-forward networks (such as convolutional neural networks) and corresponding algorithms.

A preliminary feature extraction (or embedding) operation may possibly be involved, whereby any input datafile may be extracted as a vector or matrix, or even a higher dimensional object, which may be scanned to form sequences, as explained above.

Some embodiments of the disclosure may take advantage of machine learning algorithms designed for processing sequences and, in particular, sequential processing algorithms, which can often be implemented very efficiently in hardware. These algorithms, however, cannot meaningfully be applied to images or other non-sequential data. To be able to apply such algorithms to non-sequential data, some embodiments transform the input data into data sequences. In order to achieve relevant transformations, some embodiments of the present disclosure explore distinct data paths drawn across the input data and collect data along the paths explored, so as to eventually form N sequences of objects from the input datafiles. This may reduce the dimensionality of the input data, but may also cause an effective increase in the available input data, which can advantageously be exploited for training purposes e.g., multiple scans across a single input datafile may make it possible to effectively multiply the input datasets for training. The paths may be preferably drawn at random, subject to possible constraints discussed below. To sum up, the proposed approach may make it possible to take advantage of machine learning algorithms designed for sequential data and apply such algorithms to non-sequential data, or, more generally, to any type of input data.

Another advantage is that the present methods may easily be subject to effort scaling. That is, they may start with a few paths and progressively add paths until sufficient confidence is achieved. Results obtained after running the algorithm for the first few paths may progressively improve by adding more paths. Thus, the above operations may be incrementally performed, each time considering a larger number of paths.

All this is now described in detail, in reference to particular embodiments of the disclosure.

1.2. Path Exploration

Figure 4A:
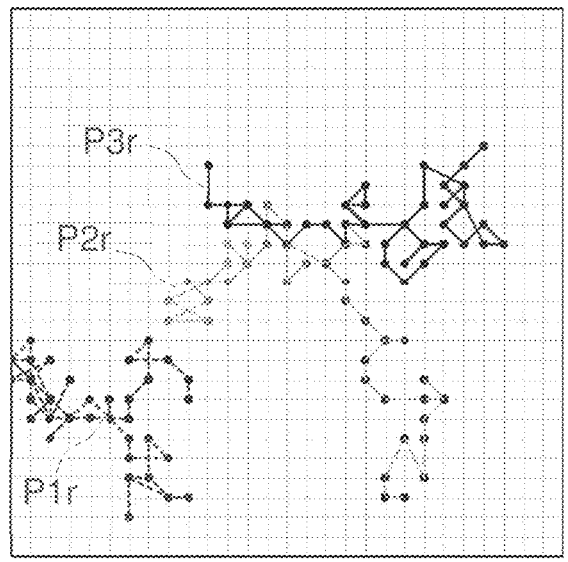
FIGS. 4A-4C schematically illustrate different types of paths that can be used to obtain the sequences, as in embodiments.
Figure 4B:
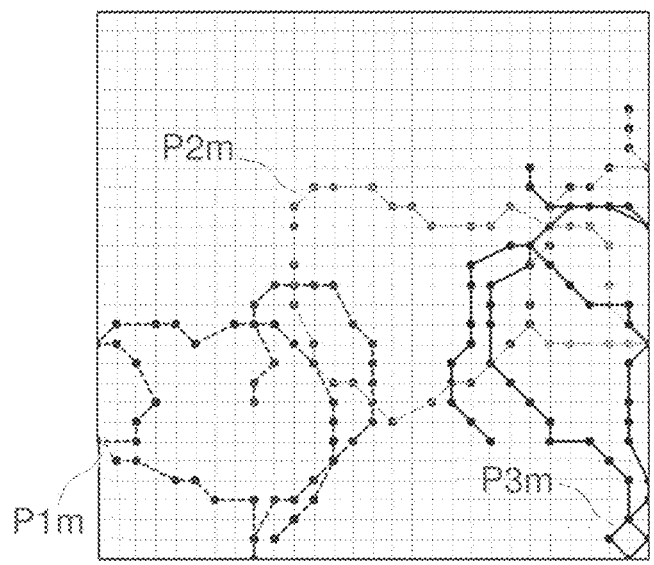
Figure 4C:
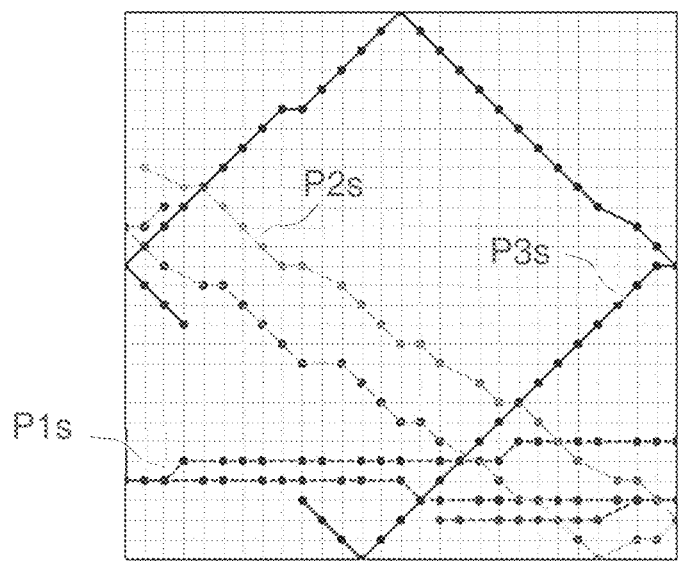

FIGS. 4A-4C depicts grids of points corresponding to pixel centers of the input image of FIG. 1, where each point may possibly be "visited" while exploring a path.

As illustrated in FIG. 4A, each path P1r, P2r, P3r may possibly be devised according to a random walk. That is, for a given path, a direction may be generated at random at each step of the random walk in the d-dimensional space, the 2D space in this example. For example, after having selected a $j^{th}$ datapoint on a given path, a direction may be chosen at random in the same space and a j+1th datapoint may be accordingly selected, and so on. Note, random paths may possibly be stopped after a given number of steps, or be randomly reflected at the boundaries (e.g., bounding boxes, or convex hulls) of the "volume" spanned by the input data, or still stopped at such boundaries. Each reflection draws a new direction. The reflection process may possibly repeat. In variants, the paths may simply be stopped when reaching such boundaries.

The step sizes of the random walk may possibly be chosen at random too, in addition to the directions. In some embodiments, the step size may be obtained by sampling a given, suitable distribution, so as to limit the spread of possible step size values to a few selected values, e.g., 1, 2, or 3.

In the example of FIG. 4B, the paths may be generated according to a mixed random walk. That is, at each step j of the walk (but the first one, i.e., j≥2), a $j^{th}$ direction may be generated at random and merged with the j-1$^{th}$ direction, as generated at step j-1. At step 1, the first direction may simply be generated at random. Note, at each subsequent step, directions may be merged by simply averaging two corresponding unit vectors. If necessary, weighted averages may be used. This way, a "merged" direction may be obtained at each step and the walk may be advanced by one step in the merged direction. This may allow smoother paths P1m, P2m, P3m to be obtained, which more extendedly explore the d-dimensional space subtended by the input data. Such a walk may be regarded as an adjusted, mixed, or interpolated random walk. Similarly, step sizes may be mixed at each step. And again, the walk may possibly be reflected or stopped at the boundaries, or stopped after a given number of steps. Interpolated random walks are also assumed in FIGS. 2A-2C.

In the example of FIG. 4C, each path P1s, P2s, P3s may be generated according to a random shot. That is, each path may be generated according to steps made in a fixed direction, which may be initially chosen at random in the d-dimensional space. More precisely, this direction may be initially be chosen at random and then maintained fixed at each subsequent step. The paths may again be reflected or stopped at the boundaries, or stopped after a given number of steps.

In each case (random walk, mixed random walk, or random shoot), the initial seed too (i.e., where to start the walk) may possibly be chosen at random.

1.3. Preferred Machine Learning Algorithms and Network Architectures—Sequential Processing Algorithms As said, the neural network may have various possible architectures and may be run S57, S67, S77 according to various possible machine learning algorithms, these including reservoir computing algorithms (so as to limit the training to the readout stage) and echo state network algorithms. In variants, more conventional architectures and algorithms may be used, such as feedforward neural networks, e.g., convolutional neural networks or, more generally, other recurrent neural networks, as these are particularly well suited for sequential data processing.

Echo state networks are one type of reservoir computing algorithms, which are themselves a class of recurrent neural network algorithms. Echo state networks are recurrent neural networks that are trained only at the output and have fixed connections between the hidden neurons. They can therefore be implemented efficiently in hardware, e.g., using photonic systems or field programmable gate arrays (FPGAs). More generally, reservoir computing systems can advantageously be implemented in hardware, such as an optical neuromorphic system (e.g., as a photonic circuit configured as a node array, time-delay systems), an analog circuit (e.g., involving memristive elements), a very large scale integration (VLSI) circuit, using FPGAs, etc.

Of particular advantage is to devise the network architecture based on the size of the objects of the sequences. In that respect, in embodiments, each of the M objects of each of the N sequences may be a k-dimensional object, $k \geq 1$, of size $N_k \geq 2$. I.e., each object comprises $N_k$ values. For example, each object may be a 1-dimensional array (a vector) with at least two values (e.g., collected on each side of a point on a given path). In practice, the dimension of each object will typically be larger than or equal to 2 (i.e., $k \geq 2$) or, in fact, equal to the dimension d of the input space. For example, each object may be a 2-dimensional array (i.e., a 2D matrix) including $N_k = Q_k^2$ values, with $N_k \geq 4$, or a 3-dimensional array (with $N_k \geq 8$), etc. The present approach has notably been tested for 2D images, where 3×3 pixel windows were slid along paths drawn on the image. More generally, the path exploration process may lead a set of $N_k$ values for each of the M objects of each of the N sequence formed. And, as described earlier, such values may advantageously be obtained according to a d'-dimensional window centered on each point of the path explored, where $d' \leq d$.

In such cases, the network may advantageously comprise $N_k$ input nodes. This way, the M sets of values obtained for each of the N sequences may be sequentially coupled S56, S66, S76 into the $N_k$ input nodes of the network in order to sequentially run the network for each of the M objects of a given sequence, according to a sequential processing algorithm. The process may then repeat for each of the N sequences. For example, a trained model may include N base learners, corresponding to respective ones of the N sequences. In that case, each base learner is sequentially run M times, such that N base learners are run in total for the N sequences.

In simpler variants, each datapoint contains a single value (e.g., a pixel value), meaning that a single value is collected at each point of each path generated. In other variants, the network may include M input nodes and be run once for each of the $N_k$ values captured by each object. In further variants, the network may include $M \times N_k$ input nodes, etc.

1.4. Inferences (Classifications, Predictions)

In literature, the terminologies "cognitive algorithm", "cognitive model", "machine learning model", or the like, are often interchangeably used. Here, for the sake of clarification, the following definitions are adopted. First, machine learning algorithms include algorithms used for inference and/or training purpose. An algorithm used for training purpose is here called a cognitive algorithm. A cognitive model is obtained by using a cognitive algorithm, which allows discovery of the parameters of a cognitive model during the training phase, from suitable examples provided, e.g., by a user. So, a distinction is made between a cognitive algorithm (as used to train the model) and the resulting model, i.e., the object that is eventually obtained upon completion of the training, which model can be used for inference purposes. That is, in this document, a cognitive model is a trained model.

Figure 6:
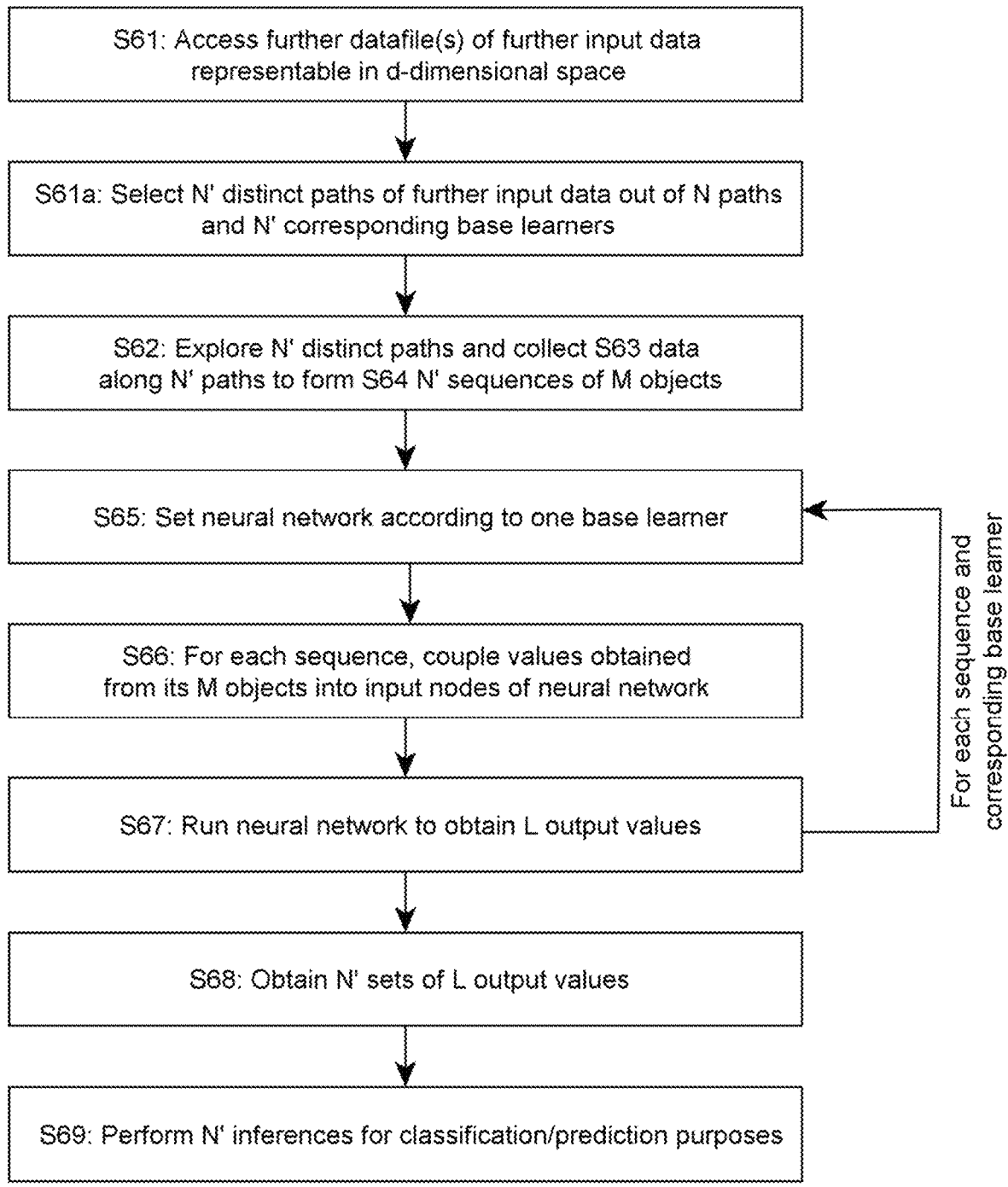
Figure 7:
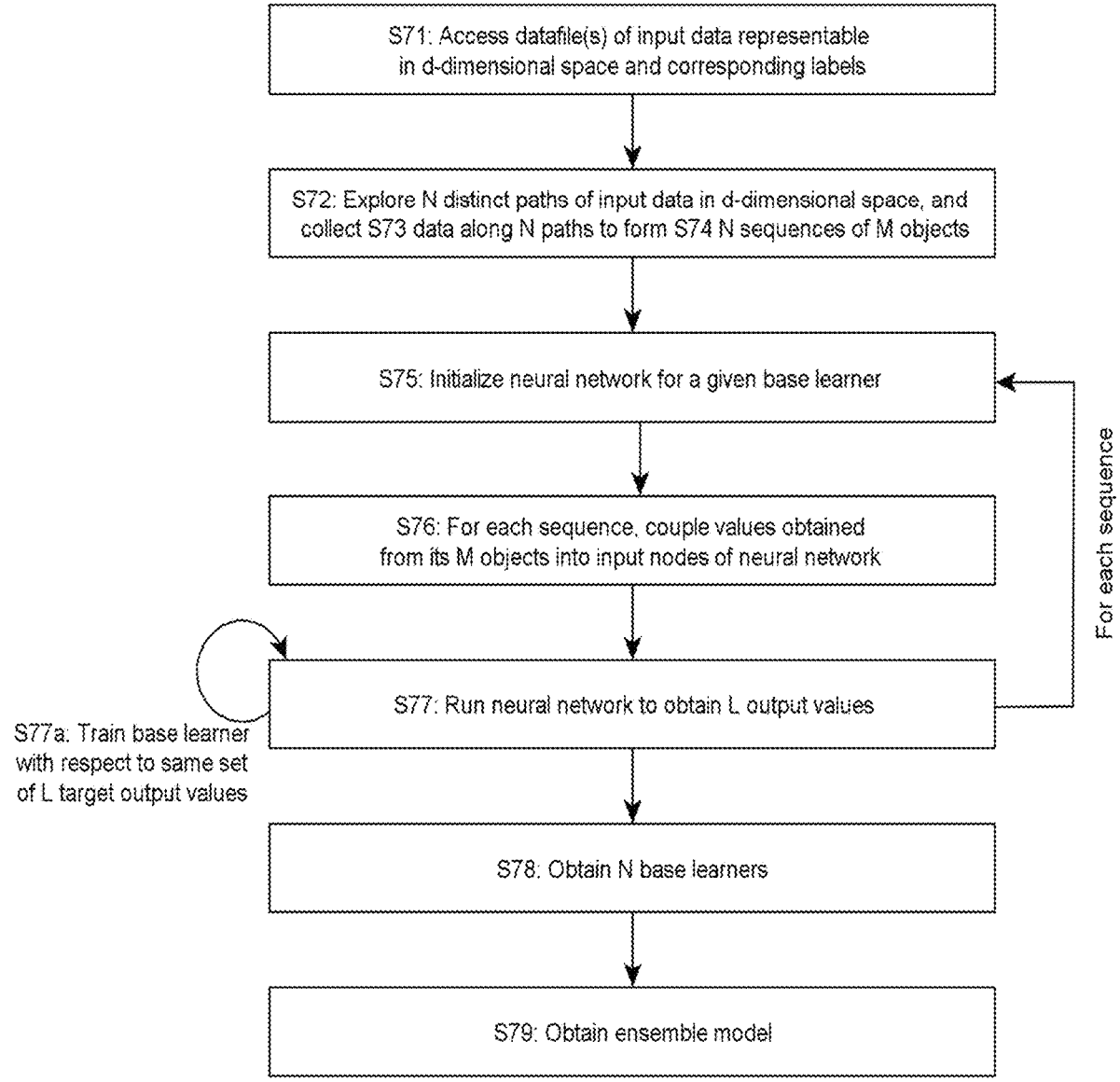

Each of the flowcharts shown in FIGS. 5-7 assumes that the cognitive model being used or trained is an ensemble model including N base learners, i.e., one learner per sequence. This is the reason why the network needs to be initialized S55, S75 for training or set S65 according to a given base learner.

The flow depicted in FIG. 5 may notably be used for mere inference purposes, as also illustrated in FIG. 6, which reflects a particular embodiment discussed later in detail. Assuming that the flow of FIG. 5 is used for inference purposes, the network may need to be set S55 according to a given set of parameters of a base model (i.e., parameters as obtained by training a given base learner), prior to coupling values obtained for a given sequence into input nodes of the network. The network may be run S57 according to the given set of parameters, so as to provide L output values. The same process may repeat for each of the N sequences S1-S3 formed S54, so as to eventually obtain N sets of L output values, operation S58, based on which N inferences can be performed. That is, the network may be run multiple times, one time for each of the N sequences formed.

The N inferences performed may aim at performing a prediction or a classification. For example, a majority of votes (as obtained from all of the N inferences) may be used to obtain a final classification. For predictions, one may simply average out the N outputs obtained from the N input sequences. As an example, the method may first draw a set of paths at random. Then it may extract data along each path formed in the original data to form sequences, whereby a full new dataset (a sequence of objects) is obtained for each path. Then, a sequence processing algorithm may be applied to each new dataset and the N predictions obtained may eventually be added or averaged to form a final, ensemble prediction.

The full flow of FIG. 5 is summarized as follows. One or more datafile(s) of input data may be accessed at operation S51. The input data may be representable in a d-dimensional space and may accordingly all be loaded in memory to populate a corresponding data structure, the memory permitting. At operation S52, N distinct paths of input data may be explored in the d-dimensional space. Data may be collected S53 along each of the N paths to respectively form N sequences of M objects, operation S54. At operation S55, the neural network may be set according to given parameters, in view of performing inferences. Values as obtained from the M objects of each sequence may then be coupled into input nodes of the neural network at operation S56, in view of running S57 the neural network, which may yield L output values. The process may loop back to S55, and thus, may repeat for each of the N sequences. Eventually, N sets of L output values may be obtained, operation S58.

A similar flow may be used for training purposes. In this case, the neural network may be initialized at operation S55 and additional steps may be needed for training the model, as now discussed in reference to FIG. 7, considering the functional correspondences between operations S5$j$, S6$j$, and S7$j$ of FIGS. 5, 6, and 7, for 1≤$j$≤7.

1.5. Training Flows

Prior to performing inferences, the cognitive model may be trained using a scheme retaining features as described above in reference to FIG. 5 using the system described in more detail with reference to FIG. 8. Namely, the network may be run S77 according to a cognitive algorithm to train S77$a$ the cognitive model in a supervised manner. Each base learner may be trained with respect to a same set of L target output values, for each of the N sequences. That is, the cognitive algorithm learns N sets of parameters, operation S78, based on the same set of L target output values. In other words, a base learner may be trained for each of the N sequences formed. The target output values may typically be set according to labels provided by a user.

Given N sequences formed S74, the algorithm may learn N sets of parameters (N>1), which may latter be averaged or otherwise processed S79 to obtain an ensemble model. But, first, N distinct trainings may be performed S77-S77$a$, based on the N sequences formed. Thus, separate base learners (e.g., classifiers) may be trained S77-S77$a$ for each sequence, similar to bootstrapping methods.

The training operations described above may be applied to a single input datafile 10 or to several input datafiles 10, forming a unitary set (representable in the d-dimensional space), from which N sequences are extracted. Such training operations may further be repeated to learn parameters from K (sets of) input datafiles, in which case K×N sets of cognitive parameters may eventually be obtained, i.e., N learners are obtained for each of the K (sets of) input files. Eventually, an ensemble model may be obtained from the K×N sets of cognitive parameters. Conversely, the K (sets of) input datafiles may initially be loaded to form a single input dataset, so as to obtain N sets of cognitive parameters. Consider the example of the MNIST dataset; each image of the set may possibly be considered as a single input datafile and loaded as such for training purposes. The training may, in that case, be successively performed for every image of the dataset. However, the same N paths may be applied on each image, each time, and a classifier may be trained for each of the N paths, leading to N sets of parameters for each image. In variants, the whole set of images may be loaded to form a single data structure encompassing the whole dataset, memory permitting.

The full flow of FIG. 7 is as follows. One or more datafiles of input data may be accessed at operation S71, together with corresponding labels. N distinct paths of input data may be explored at operation S72, so as to collect S73 data along the paths and form S74 the N sequences of M objects. Operation S75: the neural network may be initialized in view of training a given base learner for a current sequence. Operation S76: for each sequence, values obtained from the corresponding M objects may be coupled into the input nodes of the neural network, in view of running S77 the latter and obtain L output values. Such output values may then be compared to target values to refine S77$a$ the parameters (i.e., synaptic weights). Operations S77 and S77$a$ may repeat, as necessary, to train the current base learner and reach optimal parameters thereof. The training operations S75-S77 may repeat for each sequence, which eventually gives rise S78 to N base learners, based on which an ensemble model can be obtained S79.

In a variant of the above flow, values obtained from each path may possibly be interchanged during the training, and this for each of the N sequences formed. That is, the cognitive algorithm that is used for training a current model may be paused, prior to coupling values obtained from the M objects of a distinct sequence into the input nodes of the network, and then resuming the training of the current model. In other words, the sequences may be interchanged while training multiple instances of a same model. That is, the training may be resumed based on data obtained from a different path. The training may, for instance, be dropped if a useless path is detected (e.g., an edge path was inadvertently generated, which contains only 0s or 1s). The same operation may be repeated or executed in parallel for multiple training processes.

1.6. Inferences Made from Subsets of Base Learners

Once an ensemble model has been obtained, operation S79, inferences may be performed with respect to further datafiles (comprising further input data), as now discussed in reference to FIG. 6. The number N' of paths as now considered for inference purposes may be smaller than or equal to the number N of paths previously considered for training purposes, to speed up inferences. More precisely, the paths considered for inference purposes may be a subset of the paths used for training. However, the paths selected for inferences should correspond to a subset of the paths as generated for training purposes. Thus, the N' paths used on inferences should be selected from the N paths as previously used for the training. The number N' of paths used for inference purposes may, for example, be user-configurable or user-selectable.

Thus, one or more further datafiles (corresponding to further input data) may be accessed at operation S61; such data have the same dimensionality as data used for training. Next, N' distinct paths may be selected S61$a$ from N distinct paths previously explored, 1≤N'≤N, and then explored S62, in view of collecting S63 data to respectively form N' sequences of M objects each, operation S64. Next, for each of the N' sequences formed, values obtained from the respective M objects may be coupled S66 into the input nodes of the neural network, so as to run S67 the latter and obtain L output values. The process may repeat for each sequence, so as to eventually obtain N' sets of L output values, operation S68.

Although the cognitive model may comprise N learners, only N' of these learners may be selected. The values of L and M should be the same for the training and inferences. Preferably, the same paths are used both for inferences and training purposes, in which case N=N' (yet the data files used differ), i.e., the same path structures are used for both training and inference purposes, where the paths are applied across distinct input data. The case N=N' amounts to selecting all of the N learners i.e., no subset of learners need be selected in that case.

As said, FIG. 7 assumes that the cognitive model used includes a set of N base learners, each corresponding to a respective one of the N distinct paths. Thus, each of the N' base learners as used at operation S65-S67 should be selected S61$a$ consistently with the N' distinct paths selected, so as to be able to assign the N' base learners to respective ones of the N' sequences as formed at operation S64. Consistently, the neural network may need, at each cycle, to be set S65 according to parameters of a relevant base learner. The network may be run S67 for each of the N' sequences formed S64 to perform one inference based on a respective base learner. One may eventually obtain N' sets of L output values, based on which N' inference results may be returned S69, e.g., for classification or prediction purposes. For example, one may obtain a classification result for each of the N' classifications performed and then one may consider the majority of votes, as explained earlier.

Next, according to another aspect, the disclosure may be embodied as a computer program product for operating a neural network. The computer program product may comprise a computer readable storage medium having program instructions embodied therewith, wherein the program instructions are executable by a processor, so as to cause the processor to execute according to methods as described herein. Additional features of this computer program product are described in detail in section 2.2.

2. Technical Implementation Details
2.1 Computerized Systems and Devices

Computerized systems and devices may be suitably designed for implementing embodiments of the present disclosure as described herein. In that respect, it may be appreciated that the methods described herein are largely non-interactive and automated. In some embodiments, the methods described herein may be implemented either in an interactive, a partly-interactive, or a non-interactive system. The methods described herein may be implemented in software, hardware, or a combination thereof. In some embodiments, the methods proposed herein may be implemented in software, as an executable program, the latter executed by suitable digital processing devices. More generally, embodiments of the present disclosure may also be implemented wherein virtual machines and/or general-purpose digital computers, such as personal computers, workstations, etc., are used.

Figure 8:
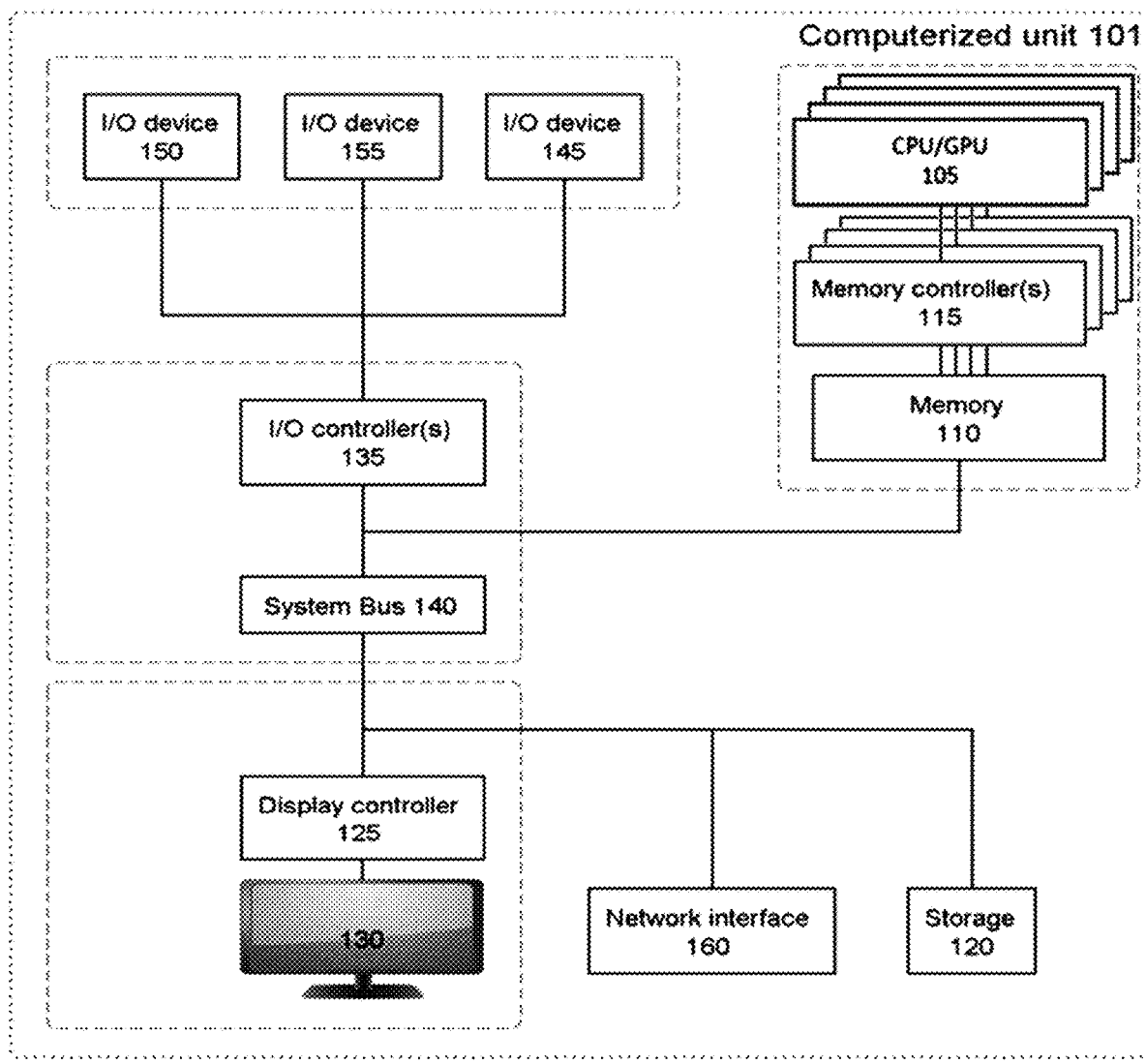
FIG. 8 schematically represents a general purpose computerized system, suited for implementing one or more method operations as involved in some embodiments as disclosed herein.

For instance, FIG. 8 schematically represents a computerized unit 101 (e.g., a general- or specific-purpose computer), which may possibly interact with other, similar units, so as to be able to perform operations according to the present methods, including the methods described with reference to FIGS. 1-7.

In some embodiments, in terms of hardware architecture, as shown in FIG. 8, each unit 101 may include at least one processor 105, and a memory 110 coupled to a memory controller 115. Several processors (CPUs, and/or GPUs) may possibly be involved in each unit 101. To that aim, each CPU/GPU may be assigned a respective memory controller.

One or more input and/or output (I/O) devices 145, 150, 155 (or peripherals) may be communicatively coupled via a local input/output controller 135. The input/output controller 135 may be coupled to or include one or more buses and a system bus 140, as known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processors 105 may be hardware devices for executing software instructions. The processors 105 may be any custom made or commercially available processor(s). In general, they may involve any type of semiconductor-based microprocessor (in the form of a microchip or chip set), or more generally, any device for executing software instructions.

The memory 110 typically includes volatile memory elements (e.g., random-access memory), and may further include nonvolatile memory elements. Moreover, the memory 110 may incorporate electronic, magnetic, optical, and/or other types of storage media.

Software in memory 110 may include one or more separate programs, each of which comprises executable instructions for implementing logical functions. In the example of FIG. 8, instructions loaded in the memory 110 may include instructions arising from the execution of the computerized methods described herein in accordance with some embodiments. The memory 110 may further load a suitable operating system (OS) 111. The OS 111 may control the execution of other computer programs or instructions, and may provide scheduling, input-output control, file and data management, memory management, and communication control and related services.

Possibly, a conventional keyboard and mouse may be coupled to the input/output controller 135. Other I/O devices 140-155 may be included. The computerized unit 101 may further include a display controller 125 coupled to a display 130. The computerized unit 101 may also include a network interface or transceiver 160 for coupling to a network, to enable, in turn, data communication to/from other, external components, e.g., other units 101.

The network may transmit and receive data between a given unit 101 and other devices 101. The network may possibly be implemented in a wireless fashion, e.g., using wireless protocols and technologies, such as Wifi, WiMax, etc. The network may notably be a fixed wireless network, a wireless local area network (LAN), a wireless wide area network (WAN), a personal area network (PAN), a virtual private network (VPN), an intranet or other suitable network system, and may include equipment for receiving and transmitting signals. Typically, this network allows very fast message passing between the units.

The network may also be an IP-based network for communication between any given unit 101 and any external unit, via a broadband connection. In some embodiments, network can be a managed IP network administered by a service provider. Additionally or alternatively, the network may be a packet-switched network such as a LAN, WAN, Internet network, an Internet of things network, etc.

2.2 Computer Program Products

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

2.3 Clouds

Computations performed according to the present methods may possibly be provided as a cloud service. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9A:
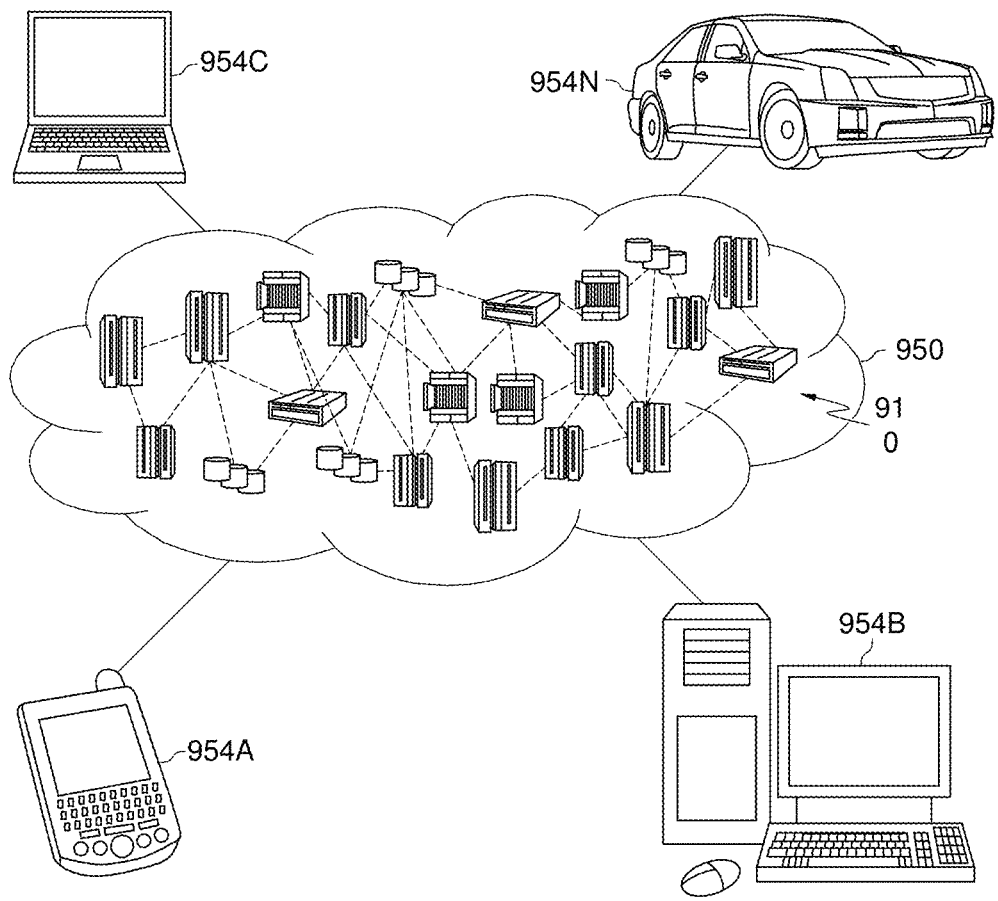
FIG. 9A depicts a cloud computing environment according to some embodiments disclosed herein.

Referring now to FIG. 9A, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 1 are intended to be illustrative only and that computing nodes 910 and cloud computing environment 950 can communicate with any type of computerized device over any type of network and/or network addressable connection (e.g., using a web browser).

Figure 9B:
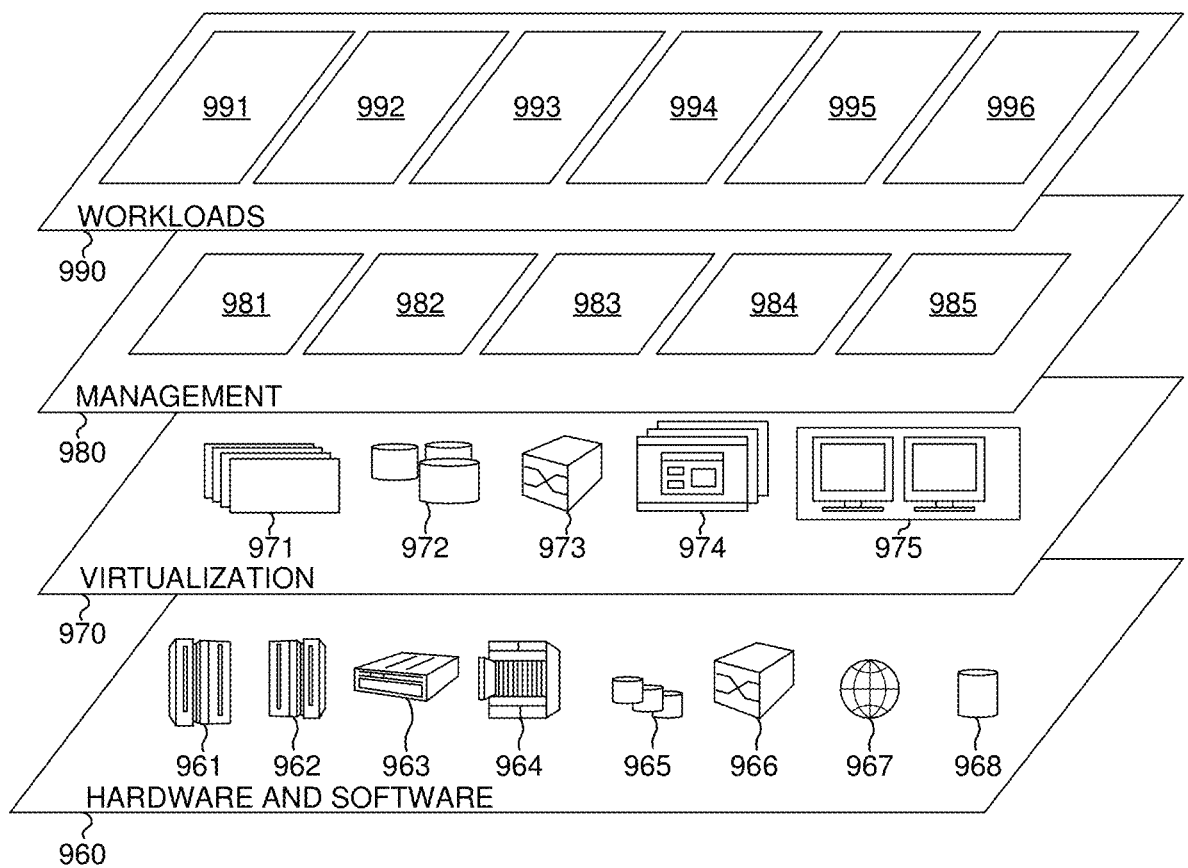
FIG. 9B depicts abstraction model layers according to some embodiments disclosed herein.

Referring now to FIG. 9B, a set of functional abstraction layers provided by cloud computing environment 950 (FIG. 9A) is shown. It should be understood in advance that the components, layers, and functions shown in FIG. 9B are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and cognitive model 996.

3. General

While the present disclosure has been described with reference to a limited number of embodiments, variants and the accompanying drawings, it will be understood by those skilled in the art that various changes may be made and equivalents may be substituted without departing from the scope of the present disclose. In particular, a feature (device-like or method-like) recited in a given embodiment, variant or shown in a drawing may be combined with or replace another feature in another embodiment, variant or drawing, without departing from the scope of the present disclosure. Various combinations of the features described in respect of any of the above embodiments or variants may accordingly be contemplated, that remain within the scope of the appended claims. In addition, many minor modifications may be made to adapt a particular situation or material to the teachings of the present disclosure without departing from its scope. Therefore, it is intended that the present disclosure not be limited to the particular embodiments disclosed, but instead, that the present disclosure will include all embodiments falling within the scope of the appended claims. In addition, many other variants than explicitly touched above may be contemplated.

What is claimed is:

1. A computer-implemented method of obtaining values by running a neural network according to a machine learning algorithm designed to operate on sequences of data, the method comprising:
   accessing one or more datafiles of input data representable in a d-dimensional space, wherein d>1;
   by a processor, forming N sequences of M objects each by exploring N distinct paths of said input data in the d-dimensional space and collecting data along the N distinct paths explored, wherein N≥1 and M≥2;
   for one or more sequences of the N sequences formed, by the processor, coupling values obtained from the M objects of each sequence into one or more input nodes of a neural network and running the neural network according to said machine learning algorithm to obtain L output values for each sequence of the N sequences, wherein L≥1, and wherein N sets of L output values are obtained for the N sequences;
   by the processor, training parameters of a cognitive model using the N sets of L output values; and
   by the processor, performing N inferences for the N sequences using the cognitive model after training.

2. The computer-implemented method according to claim 1, further comprising:
   prior to coupling said values, setting, for each of the N sequences formed, the network according to a given set of parameters of a cognitive model.

3. The computer-implemented method according to claim 2, further comprising:
   transmitting the prediction or the classification based on the N inferences performed.

4. The computer-implemented method according to claim 1, wherein:
   N>1 and the method further comprises averaging out outcomes from said N inferences.

5. The computer-implemented method according to claim 1, wherein:
   said machine learning algorithm is a cognitive algorithm and the network is run according to said cognitive algorithm to train a cognitive model in a supervised manner with respect to a same set of L target output values for each of the N sequences formed, permitting the cognitive algorithm to learn N sets of parameters of the cognitive model based on the same set of L target output values.

6. The computer-implemented method according to claim 5, wherein:
   N>1 and the method further comprises obtaining an ensemble model based on the N sets of parameters learned.

7. The computer-implemented method according to claim 6, wherein the method further comprises, after having obtained the ensemble model, performing inferences by:
   accessing one or more further datafiles of further input data representable in the d-dimensional space;
   exploring N' distinct paths of said further input data in the d-dimensional space, wherein the N' distinct paths are selected from the N distinct paths previously explored, 1≤N'≤N, and, based on the further input data, collecting data along the N' distinct paths explored to respectively form N' sequences of M objects each; and
   for each sequence of the N' sequences formed, coupling values obtained from the M objects of each of the N' sequences formed into the one or more input nodes of the neural network and running the latter to obtain L output values, to eventually obtain N' sets of L output values.

8. The computer-implemented method according to claim 7, wherein:
   the cognitive model obtained includes a set of N base learners, each corresponding to a respective one of the N distinct paths; and
   the method further comprises selecting N' base learners corresponding to respective ones of the N' distinct paths selected and assigning each of the N' base learners selected to a respective one of the N' sequences formed.

9. The computer-implemented method according to claim 5, wherein the method further comprises, while the network is being run to train the cognitive model, and for each sequence of one or more of the N sequences formed:
   pausing the cognitive algorithm that is being trained; and
   coupling values obtained from the M objects of distinct one of the N sequences formed into the one or more input nodes of the network and resuming the training of the cognitive algorithm.

10. The computer-implemented method according to claim 1, further comprising:
    devising each path of said N distinct data paths according to a random walk.

11. The computer-implemented method according to claim 10, wherein:
    at devising said each path, step sizes of said random walk are chosen at random, in addition to said directions.

12. The computer-implemented method according to claim 10, wherein:
    devising said random walk comprises, at each step j thereof, j≥2, generating a $j^{th}$ direction at random in said d-dimensional space, merging the $j^{th}$ direction generated with the $j-1^{th}$ direction as generated at step j−1 of the walk to obtain a merged direction, and advancing the walk by one step in the merged direction.

13. The computer-implemented method according to claim 1, further comprising:
devising each path of said N distinct path according to a random shot.

14. The computer-implemented method according to claim 1, wherein:
the network is run according to a recurrent neural network algorithm.

15. The computer-implemented method according to claim 1, wherein:
the network is run according to an echo state network algorithm.

16. The computer-implemented method according to claim 1, wherein:
the network is run according to a feedforward neural network algorithm.

17. The computer-implemented method according to claim 1, wherein:
each of the M objects of each of the N sequences is a k-dimensional object, $k \geq 1$, comprising $N_k$ values, $N_k \geq 2$.

18. The computer-implemented method according to claim 17, wherein:
the network comprises $N_k$ input nodes; and
the method further comprises, for each of the N sequences, sequentially coupling M sets of values into said $N_k$ input nodes, in order to sequentially run the network for each of M objects of each of the N sequences, according to a sequential processing algorithm.

19. The computer-implemented method according to claim 17, wherein:
$k \geq 2$.

20. A computer program product for obtaining values by running a neural network according to a machine learning algorithm designed to operate on sequences of data, the computer program product comprising a computer readable storage medium having program instructions embodied therewith, the program instructions executable by a processor, so as to cause the processor to:

access one or more datafiles of input data representable in a d-dimensional space, $d > 1$;

explore N distinct paths of said input data in the d-dimensional space, $N \geq 1$, and collect data along the N distinct paths explored to respectively form N sequences of M objects each, $M \geq 2$;

for each sequence of the N sequences formed, couple values obtained from the M objects of said each sequence into one or more input nodes of a neural network and run the neural network according to said machine learning algorithm to obtain L output values for each sequence of the N sequences, $L \geq 1$, and wherein N sets of L output values are obtained for the N sequences;

by the processor, training parameters of a cognitive model using the N sets of L output values; and by the processor, performing N inferences for the N sequences using the cognitive model after training.

\* \* \* \* \*